(12) United States Patent
Patrick et al.

(10) Patent No.: US 9,620,167 B2
(45) Date of Patent: Apr. 11, 2017

(54) BROADCAST-QUALITY GRAPHICS CREATION AND PLAYOUT

(71) Applicant: Phizzle, Inc., San Francisco, CA (US)

(72) Inventors: Michael August Patrick, Melville, NY (US); Chris Ryan Brady, Denver, CO (US)

(73) Assignee: PHIZZLE, INC., San Francisco, CA (US)

( * ) Notice: Subject to any disclaimer, the term of this patent is extended or adjusted under 35 U.S.C. 154(b) by 0 days.

(21) Appl. No.: 14/574,222

(22) Filed: Dec. 17, 2014

(65) Prior Publication Data

US 2015/0178971 A1 Jun. 25, 2015

Related U.S. Application Data

(60) Provisional application No. 61/920,463, filed on Dec. 23, 2013.

(51) Int. Cl.
*G06T 13/00* (2011.01)
*G11B 27/00* (2006.01)
*G06T 13/20* (2011.01)

(52) U.S. Cl.
CPC .............. *G11B 27/00* (2013.01); *G06T 13/20* (2013.01)

(58) Field of Classification Search
None
See application file for complete search history.

(56) References Cited

U.S. PATENT DOCUMENTS

| 6,938,217 | B1* | 8/2005 | Ubillos | G06F 3/0486 345/442 |
| 8,836,706 | B2* | 9/2014 | Zhao | G11B 27/034 345/473 |
| 2013/0120405 | A1* | 5/2013 | Maloney | G06T 13/00 345/474 |
| 2013/0219344 | A1* | 8/2013 | Zyracki | G06T 13/20 715/849 |
| 2013/0232121 | A1* | 9/2013 | Tucker | G06F 17/30283 707/655 |
| 2015/0195375 | A1* | 7/2015 | Danziger | G06F 17/246 709/203 |

OTHER PUBLICATIONS

Microsoft PowerPoint 2010 Training, Apr. 19, 2011, http://www.nysl.nysed.gov/libdev/nybbexpress/curriculum/poklib/pp101.pdf, all pages pertinent.*

* cited by examiner

*Primary Examiner* — Frank Chen
(74) *Attorney, Agent, or Firm* — Ascenda Law Group, PC

(57) ABSTRACT

Methods and systems for creating and playing out animated video scenes. An animated scene is created by first receiving a selection of an asset element to be used in the scene. Next, a first marker position is received, a first marker is displayed at the marker position, and an association between the asset element and the first marker is established. This process is repeated for a second marker displayed at a second marker position. Thereafter, a movement path from the first marker position to the second marker position is established. The movement path includes a sequence of coordinates and associated times. Finally, the instructions that cause the asset element to move along the movement path are generated.

10 Claims, 5 Drawing Sheets

BROADCAST-QUALITY GRAPHICS CREATION AND PLAYOUT

RELATED APPLICATIONS

This is NONPROVISIONAL of, claims priority to and incorporates by reference U.S. Provisional Application 61/920,463, filed Dec. 23, 2013.

FIELD OF THE INVENTION

The present invention relates generally to computer graphics. More particularly, the present embodiments relate to techniques for creating and displaying scenes that can include moving graphical objects.

BACKGROUND

Videos shown on television or in other venues such as sporting events are created in several steps that are ordinarily performed separately. Existing systems for generating videos suitable for display on television are costly and use dedicated hardware. Three dimensional graphics, such as moving objects and text, can be generated based on user instructions and displayed in the videos. Software products such as After Effects® from Adobe Systems Incorporated of San Jose, Calif. can be used to create three dimensional moving objects, but specifying the movement of objects using these products ordinarily involves relatively complex three-dimensional operations that can be difficult and time-consuming to use.

SUMMARY

In one or more embodiments, an integrated digital media production system can produce digital media such as videos, television programs, and the like, by using media elements such as graphical images, video files, and the like to produce animated scenes in accordance with user-defined movement instructions. The process of creating and presenting the digital media elements can be distributed across multiple computer systems, which can be at different locations, thus enabling different users of the system, such as asset creators, scene creators, and graphics operators to use the system to access and create media elements at the corresponding stages in the production process.

The media elements, such as assets, scenes, and other relevant data, are stored in an asset manager (e.g., an asset management system). Changes made by one user to objects, such as the assets and scenes, can be automatically propagated through the asset manager to other users' computer systems, so that the other users can see and access the updated assets and scenes soon after the changes are made.

The video production system includes an asset manager that stores graphic elements and other data, a scene generator that can be used to create and modify scenes, and a playback controller that can be used to execute the scenes and generate a resulting video, such as a broadcast quality video. The asset manager can be cloud-based, and can receive the assets from content creators and make the assets available for use by other components of the video production system, which can synchronize over a network with the asset manager via a cloud storage protocol. For example, a designer can use an application such as Adobe® Photoshop® or After Effects® to produce graphics assets, such as a lower-third backplate that text can crawl over, e.g., for a television graphic such as that seen on a television news program. The designer can add the graphic to the asset manager by copying files into an established local disk based file repository. Assets are then automatically tagged, converted for use in the application. The assets are then synchronized and backed up using cloud-based file management tools. This process can be repeated to create as many assets as desired.

The scene generator provides a scene creation user interface that enables a user, such as an animator, to select and place graphical assets on a design canvas, and define the positions and motion of the assets in a three-dimensional space. That is, the animator uses the scene generator to choreograph movement of the assets by applying movement instructions to the objects. For example, instructions can be applied to the lower third backplate to cause it to move up or slide in, graphics can move in from the left or right, and text can start crawling. The user can specify that these movements, such as movement of an object to a particular location, are to occur at particular points in elapsed time during presentation of the scene. Animations can also be triggered based on events other than time, though the animation transition duration is always based on time. The scene generator creates a representation of each scene definition, e.g., in the form of an extensible markup language (XML) document, and synchronizes these representations with the asset manager. The scene generator thus stores the scene definitions in the asset manager. The scene definitions and assets stored in the asset manager can be revised and updated via the synchronization process whenever changes are made to the definitions and assets.

Scenes can be presented in a video, television program, web stream, local runtime, or the like. For example, a user working in production on a truck, at a studio, or in a venue can download the scenes and assets and play them out according to producer cues or other instructions.

The scenes can be played back at different physical locations using the playback controller, which retrieves selected scene definitions and the assets used by the selected scene definitions from the asset manager. In other words, the playback controller synchronizes with the assert manager, so that the scene definitions and corresponding assets are retrieved from cloud-based storage. In one aspect, the playback controller uses the most recent available version of the scene definitions and assets as of the time at which the playback controller generates the video. Any changes made to the scene assets and definitions automatically appear in videos generated after the changes are synchronized through the asset manager. Three-dimensional models of the motion are generated and sent to a three-dimensional rendering engine, such as the Unity® 3D engine.

In one or more embodiments, scenes can be generated from templates. The templates can generate particular types of scene assets that are customized according to specified parameter values supplied by a user. For example, if a user wishes to create a lower third graphic, the asset manager can present a number of lower third templates that create a variety of different types of lower third graphics.

The asset manager (or other associated component) can provide one or more asset templates and/or scene templates, so that when the asset manager receives a request to create a new asset, the asset template(s) can be presented, and the user can select one of the templates, e.g., a template that most closely matches the type of asset or scene the user wishes to create. The scene generator can similarly provide templates for scene creation. Values for the template parameters are requested, e.g., by prompting the user, and the received values are used to create an asset according to the information in the template and the received parameter values. The template parameters can have associated data types indicating the type(s) of data that can be supplied for the parameter, e.g., string, numeric, image, and so on.

BRIEF DESCRIPTION OF THE DRAWINGS

The included drawings are for illustrative purposes and serve only to provide examples of possible structures and arrangements for the disclosed inventive apparatuses and methods for providing a digital media production and delivery system. These drawings in no way limit any changes in form and detail that may be made to the invention by one skilled in the art without departing from the spirit and scope of the invention. The embodiments will be readily understood by the following detailed description in conjunction with the accompanying drawings, wherein like reference numerals designate like structural elements, and in which.

DETAILED DESCRIPTION

Representative applications of apparatuses and methods according to the presently described embodiments are provided in this section. These examples are being provided solely to add context and aid in the understanding of the described embodiments. It will thus be apparent to one skilled in the art that the presently described embodiments can be practiced without some or all of these specific details. In other instances, well known process steps have not been described in detail in order to avoid unnecessarily obscuring the presently described embodiments. Other applications are possible, such that the following examples should not be taken as limiting.

The techniques described herein provide an integrated digital media production system that can produce digital media such as videos, television programs, and the like, by using media elements such as graphical images, video files, and the like to produce animated scenes in accordance with user-defined movement instructions. In one or more embodiments, the process of creating and presenting the digital media elements can be distributed across multiple computer systems, which can be at different locations, thus enabling different users of the system, such as asset creators, scene creators, and graphics operators to use the system to access and create media elements at the corresponding stages in the production process.

Figure 1:
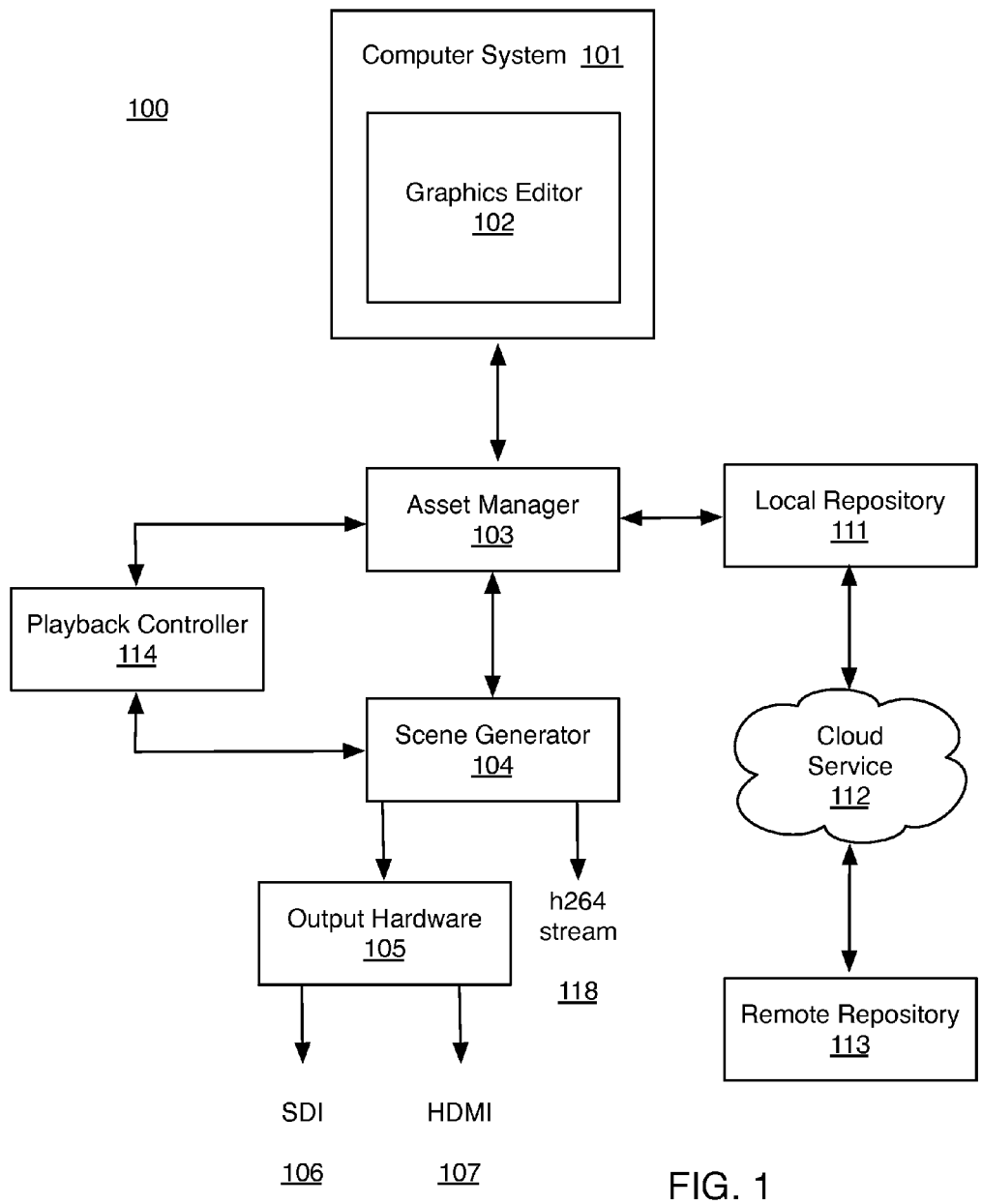
FIG. 1 is a drawing illustrating a digital media production system configured in accordance with one or more embodiments of the present invention.

FIG. 1 is an illustrative drawing of a digital media production system 100 configured in accordance with one or more embodiments of the present invention. The production system 100 includes a computer system 101 that runs a graphics editor 102 which can be used to create or edit media assets such as graphics, images, videos, three dimensional (3D) models and other media elements.

The production system 100 also includes an asset manager 103 that collects assets such as graphic elements, scene definitions, media metadata, and stores them in the local repository 111. The asset manager also converts media and platform data into native application data types and stores them in the local repository. A playback controller 114 provides a user interface for creating scenes with animated effects for playing back scenes retrieved from the asset manager 103. The playback controller can, for example, generate a video file or stream that can be sent through conventional video output hardware 105 in a variety of formats, such as SDI 106 or HDMI 107. Additionally video streams can be converted to formats such as h264 108. Video streams can be live multicast or stored to disk for digital point-to-point network transfer. In one or more embodiments, each of the system components, e.g., the graphics editor 102, asset manager 103, and playback controller 114 can be located on different computer systems, with the computer systems communicating via one or more networks. The system components need not communicate with each other, but instead can communicate with one or more cloud storage services such as the cloud service 112, which uses a remote repository 113 for the purposes of storage redundancy, synchronization, and in the case of native runtime playback, distribution of assets. In other embodiments, one or more of the system components 102, 103, 104, 105, 111, and 114 can be located on the same computer system. The arrangement of components shown in FIG. 1 is an example shown for descriptive purposes, and other arrangements are possible. For example, the asset manager 102 and scene playback controller 114 can be located on the same computer system.

In one or more embodiments, the graphics editor 102 can be an application such as Adobe® Photoshop® or After Effects® used by a graphic artist to create graphic elements. The graphic elements produced by the editor 102 can be, for example, two-dimensional images, such as image files in a format such as PNG, or movies in a format such as MOV, AVI, or the like. A graphic element can also be a three-dimensional object, such as a cube, sphere, tetrahedron, a geometric object, or a three-dimensional model of an object such as a human head constructed in a design tool such as 3D Studio Max, Maya, or the like, in a format such as FBX or 3DS. Proprietary converted 3D formats with optomized lighting may include but are not limited to PX3, PX4, and PXL files. Another example of a graphic element is a lower-third backplate that text can crawl over, e.g., for a television graphic such as that seen on a television news program. The designer can copy or move the graphics elements to the local repository 111. The asset manager 103 automatically discovers, catalogs and converts the assets. The cloud service 112 then replicates the data to the designated target repositories.

In one or more embodiments, graphical elements can be grouped together. For example, a lower third group can include a 3D backplate, an image layered on the backplate, and a sponsor logo located to the left of the backplate. Thus, several items can be grouped together into a graphic asset having a name such as "Lower Third."

In one or more embodiments, the elements stored in the asset manager 103 are organized in a project hierarchy. Scenes, asset elements, and groups can each be stored in their own category or directory in the hierarchy.

The elements can be uploaded via a cloud-based data storage protocol, or by a file transfer protocol, or other data transfer technique. The data can be sycronized between the local repository 111 and the remote repository 113 using, for example, a cloud-based storage service or device such as that provided by Dropbox® or the like. The media elements stored in the remote file repository 113 by the cloud storage service 112 can be accessed by the graphics editor 102 and the scene generator 104 through the asset manager 103 and the local repository 111. The asset manager 103 can store the preprocessed cache data in a local file repository 111, which can act as a cache to reduce access delay and, if desired, enable the scene generator 104 to continue to operate when the cloud storage service 112 is not available, e.g., when a communication network is not accessible. The workload of asset preprocessing can also be distributed across multiple platforms using the cloud service 112 to synchronize the resulting data. The local file repository 111 is, in one aspect, synchronized with the remote file repository 113 via the cloud storage service 112, so that the local repository 111 is updated to reflect changes made to the remote file repository 113. The remote file repository 113 is likewise updated to reflect changes made to the local file repository 111. The local file repository need not be present, in which case the scene generator 104 can access the elements in the remote file repository 108 via the cloud service 112. The scene generator 104 is described in more detail below.

In one or more embodiments, the playback controller 114 is used by a graphics operator to select one or more scenes from the asset manager 103, and present the scene(s) on a digital display or other output device. In one or more embodiments, scenes are stored in the asset manager as files that are converted and ready to be played, such as MOV movie files. The playback controller 114 can retrieve and render the mip mapped image on a three dimensional surface. This rendering can be stored in a buffer and either exported through a video stream 108 or through output hardware 105. In other embodiments playback is executed through a device playback runtime on a device such as a computer or mobile device. A local runtime pulls the scene definitions and appropriate assets onto the local storage of the device. The runtime executes and rasterizes the visualization utilizing the hardware on the viewers device. The scene definition contains instructions for generating a playable file from the elements stored in the asset manager 103. The playback controller 114 can then generate a MOV movie file or the like from the scene definition and the elements stored in the asset manager 103.

Changes to the scenes, such as modifying text in the included graphic elements, can be made at the scene generator 104, e.g., to correct an error or update information in response to recent events. Such changes can be made to the copy of the MOV file or scene definition and related elements in the local file repository 111. These changes need not be propagated back to the asset manager 103, as may be the case for a scene that will not be used again. Alternatively, these changes can be propagated back to the asset manager 103, in which case the changes remain in effect when the changed elements are subsequently accessed.

In one or more embodiments, the scene generator 104 can be used to choreograph three-dimensional scenes in which elements can be placed at desired locations, scaled, rotated, moved to other locations at specified times, interact with each other, and so on. For example, a lower third can initially consist of a blank screen, and, as the animation starts, a bottom plate can move up from the bottom of the screen. Simultaneously, a flash can move around the screen, then text can fade in. The choreography for this scene can be specified by a graphic designer or manager as consisting of a lower third bar pushing up, then 15 frames later a flash fades out to reveal the first piece of text, the text stays on for 15 seconds, there is another flash that stays on for 6 frames, then to the side the new text is available. The text is displayed for one minute, then the lower third backplate pushes itself down to the bottom, and the animation is done. These directions can be used to build a scene with the scene generator 104. The scene definition can then be stored in the asset manager 103.

In one or more embodiments, the content can extend beyond imported assets. Standard assets such as a globe for the purpose of visualizing geographical data can be included. Assets can also be given advanced behaviours such as but not limited to physics simulations of objects representing quantity or ratio of activity, Color or surface properties that reflect sentiment of activities, representation of a data quality through the speed or illumination of an object, etc.

In one or more embodiments, the movement of graphic elements in a scene can be choreographed using a graphical choreography user interface of the scene generator 104. In the user interface, markers can be placed at specified locations in three-dimensional space, and movement of the graphic elements can be specified relative to the marker locations. A 3-D workspace view is displayed in the user interface, and the markers can be shown floating in this 3-D space. A user can select markers using a mouse, keyboard shortcuts, or the like, and move the selected markers to different locations in the 3-D space. The objects in the scene, such as graphic elements, can be associated spatially with the markers. For example, a 2-D graphic object can be placed such that its center point is located on a marker, and the graphic is oriented to face the camera. Further, a marker can be located off screen (outside the viewable area), and a lower third bar can be associated spatially with the off screen mark, and similarly for other objects and marks. The choreography can then be defined by specifying, in the graphical user interface, which objects are at which markers. The movement of objects can be shown on the canvas interface. The designer can then move the markers themselves to different locations on the canvas, and, as a marker moves, the objects associated with the marker move along with the marker, e.g. in the same motion as the marker.

In one example, an initial position can be defined for a scene, such that each object to be shown in the scene is associated with a marker prior to the beginning of movement. The animation can then be specified by defining a second set of markers associated with the same objects and/or with different objects. The second set of markers are located at different positions than the original (first) set of markers. In the second set, a new mark can, for example, be attached (i.e., associated with or pinned to) the lower third bar, and the new mark can be in a visible location. A move can be specified to cause the objects to move from their initial positions to the positions of the markers in the second set with which the objects are associated. In the aforementioned example, the bar is initially off screen. A command to move to the second set of marks can be associated with a particular time, e.g., 3 seconds later. Thus, the objects associated with the second set of marks then appear to jump to the positions that correspond to the second set of marks. Marks differ from keyframes in that transitions between states are not defined, only the resulting arrangements and transition duration are defined. Animated assets contain the necessary logic to transition from one state to the next and operate as independent agents during the transition.

In one or more embodiments, the graphical choreography user interface enables a user to define sequences of movements. The movements can be specified by defining the positions of objects relative to their markers. The lower third bar in position, a "Coming up Next" position, and so on. The movement commands can be associated with times or time constraints. For example, a movement command can specify that after a certain period of time, e.g., 6.2 seconds or 72 frames later, movement to a second position is to occur. A time duration for the move can also be defined for the movement so that, for example, the movement to point B is to occur over a period of 16 frames, or 1.2 second, or the like. The movement of an object from point A to point B can also be associated with transform parameters that specify, in 3-D space and at a fine granularity, e.g., down to ten-thousandths of a unit, where the object is located as the object moves. Ease-in and ease-out parameters can also be specified to cause movement to accelerate and/or decelerate at locations near the endpoints of the motion. The position of an object over time can be interpolated along a curve based on the start point and end point. The speed or velocity of the object can also be interpolated based on the ease-in and ease-out parameters. The user can edit the interpolation curves, e.g., the curve of position between in-time and out-time. The x, y, z position, x, y, z rotation, and x, y, z scaling of the objects can be specified.

Figure 2:
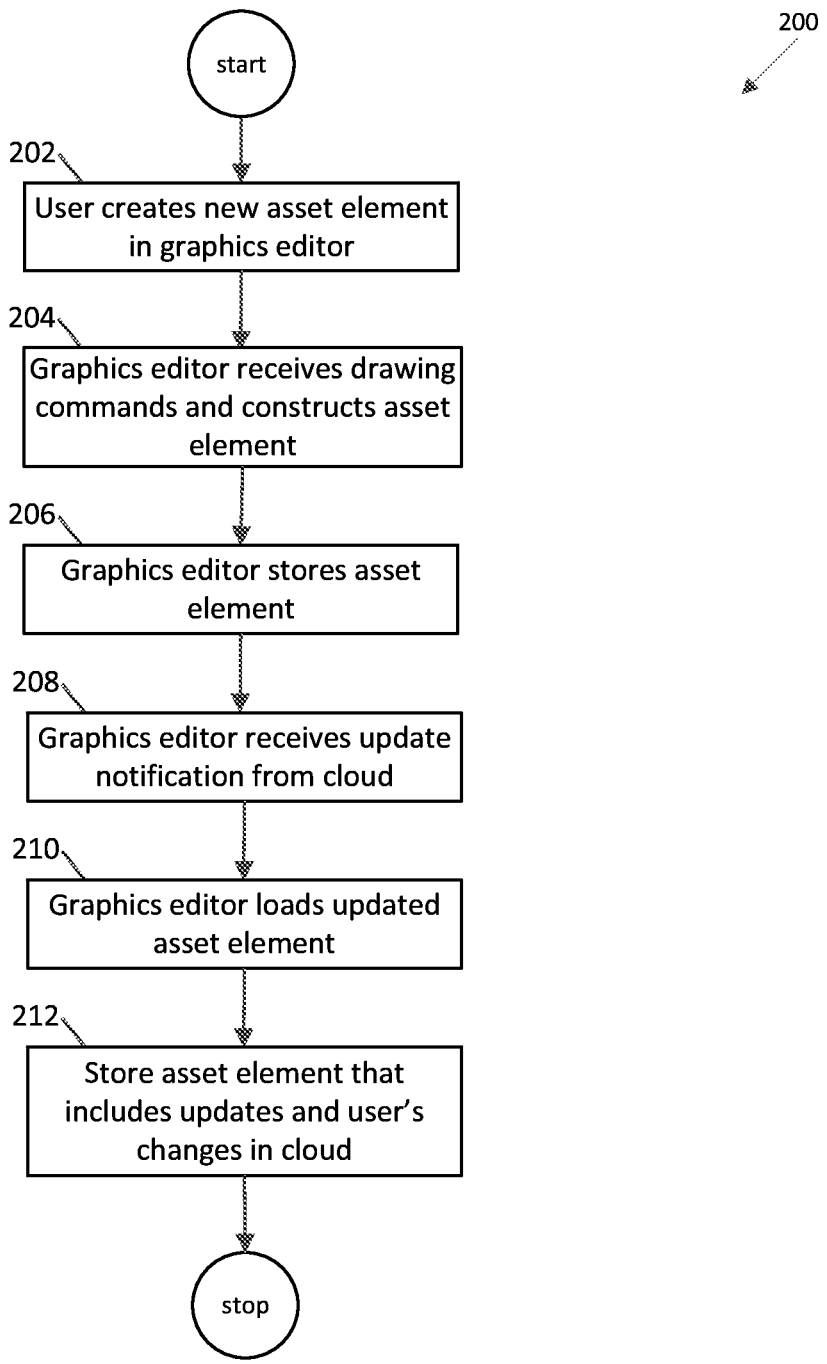
FIG. 2 is a flowchart of an illustrative process for creating and storing asset elements, in accordance with one or more embodiments of the invention.

FIG. 2 is an illustrative flowchart of a process organized in accordance with embodiments of the present invention for creating and storing asset elements in accordance with one or more embodiments. Process 200 can be implemented as, for example, computer program code encoded on a computer readable medium and executable by a processor of a computer system. Process 200 begins at block 202 when a user selects a command to create a new asset element in the graphics editor 102. At block 204, the graphics editor receives drawing commands and constructs the asset element, which can be, for example, a 2-D image, a 3-D model, a group of asset elements, and so on. At block 206, the graphics editor saves the asset element, e.g., by storing the element in a local directory that is automatically synchronized with the remote file repository 113 via the cloud service 112 and the asset manager 103, or by explicitly sending the element to the cloud service 112, or by executing some other operation that causes the element to be stored in the remote file repository 113. At block 208, the graphics editor 102 receives an update notification from the cloud service 112 (or from a local file system of the computing device executing the graphics editor 102). The update notification indicates that the stored element has changed in the remote file repository 113. The graphics editor 102 can then load the updated element at block 210, e.g., by prompting the user for approval to load the updated element and incorporate its features into the element currently being edited. In another example, the updated element does not appear in the graphics editor 102 until the user explicitly reloads the element being edited. The user can then continue editing the element, including the updated features. The user's changes to the element continue to be synchronized to the remote file repository at block 212, from which they are accessible by the other system components, such as the scene generator 104 and the playback controller 114.

Figure 3:
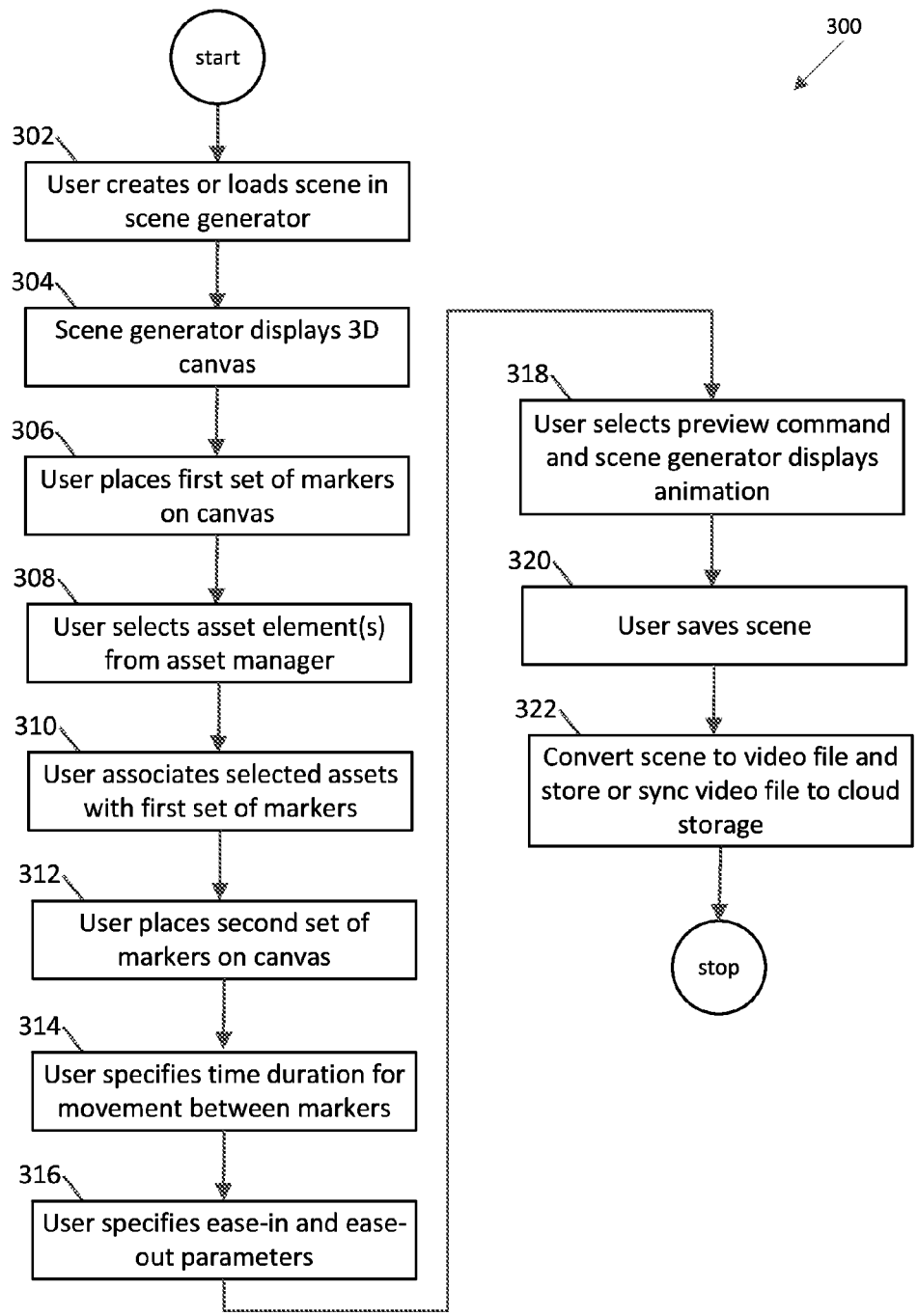
FIG. 3 is a flowchart of an illustrative process for creating scenes in accordance with one or more embodiments of the invention.

FIG. 3 is an illustrative flowchart of a process 300 for creating scenes in accordance with one or more embodiments of the present invention. Process 300 can be implemented as, for example, computer program code encoded on a computer readable medium and executable by a processor of a computer system. Process 300 begins at block 302 when a user creates a new scene or loads an existing scene in the user interface of the scene generator 104. Block 304 displays a 3-D canvas showing the asset elements in the scene, if any. At block 306, the user places a first set of one or more markers at desired locations on the canvas. The user selects one or more asset elements from the asset manager at block 308 and associates the selected assets with the first set of markers at block 310, e.g., by a command that pins the assets to the markers. At block 312, the user places a second set of one or more markers at locations on the canvas to which the asset elements should move, and pins the asset elements that are to move to the corresponding markers in the second set. At block 314, the user species a time duration for the movement from the first markers to the second markers, e.g., by entering a number of frames or seconds. At block 316, the user specifies ease-in and ease-out parameters that control movement characteristics such as acceleration and deceleration of the objects as they move away from the first markers and arrive close to the second markers. The user can also specify orientation, rotation, and scaling parameters for the objects as they move between the two sets of markers. The information provided by the users, including the times and parameters, can be associated with the second set of markers, or can be associated with a "movement instruction." In another example, the information specifying the movement can be associated with the timeline, e.g., at the start and end times of the movement. At block 318, the user can select a preview command, and the scene generator 104 displays the animation as it will appear when displayed by the playback controller 114. At block 320, the user saves the scene, which causes the scene description to be sent to the asset manager 103 via the cloud service 112 and stored. The scene description can also be saved incrementally and/or transparently as the user works by synchronization with the cloud service 112. The scene can be converted to a MOV or other movie or video file at block 322, in which case the movie or video file is stored in the asset manager 103 along with the scene definition.

Figure 4:
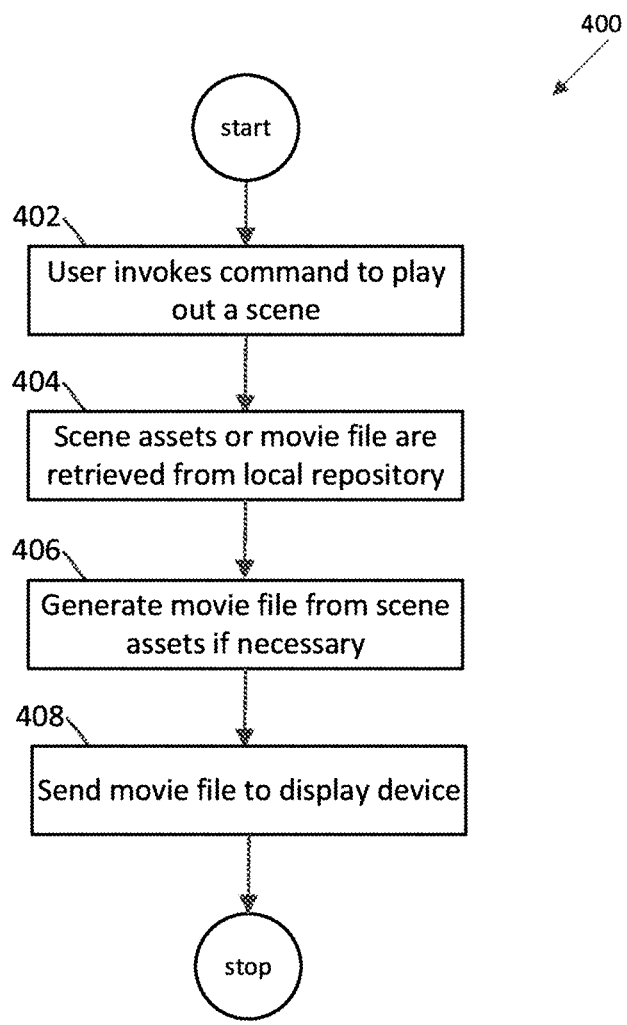
FIG. 4 is a flowchart of an illustrative process for playing out a scene or video in accordance with one or more embodiments of the invention.

FIG. 4 is an illustrative flowchart of a process 400 for playing out a scene or video in accordance with one or more embodiments of the present invention. Process 400 can be implemented as, for example, computer program code encoded on a computer readable medium and executable by a processor of a computer system. Process 400 begins at block 402 when a user of the playback controller 114 invokes a command to play a scene. The user selects the scene from the asset manager 103, and the scene assets and/or previously generated movie or video file for the scene is retrieved from the local file repository 111 at block 404. The local file repository 111 is automatically synchronized with the remote file repository 113 by, for example, a cloud storage service, so the assets and/or files that are retrieved are ordinarily copies of the most recent assets and/or files stored at the remote file repository 113. The most recent assets and files are appropriate in many usage scenarios, but in other usage scenarios, the user of the playback controller 114 may instead request assets and files that are associated with a specific tag or version number. Assets and files can be associated with tags (e.g., short text strings, such as "Final" or the like) by the graphics editor 102, the asset manager 103, the scene generator 104, or the local file repository 111 to provide a name for the versions of the assets and files that existed at a particular time. Specific version numbers can also be used. For example, each time an asset is revised in the graphics editor 102, a version number associated with the asset can be incremented. A certain version number, e.g., 1, can be retrieved via the asset manager 103 even if the asset has been changed subsequently to version 1 (in which case the current version is greater than 1). Thus, the user can specify a particular tag or version number of assets and files to be used, and the assets and files associated with that tag or version number are retrieved from the asset manager 103 at block 404. Block 404 can also load assets, files, and any other data in the asset manager 103 and referenced by the scene description. Block 406 generates a movie or video file from the scene description and assets, if the movie or video file is not available. Block 408 sends the movie or video file to the output hardware 105 or other output device to cause the scene to be displayed on or transmitted via the appropriate digital display.

Figure 5:
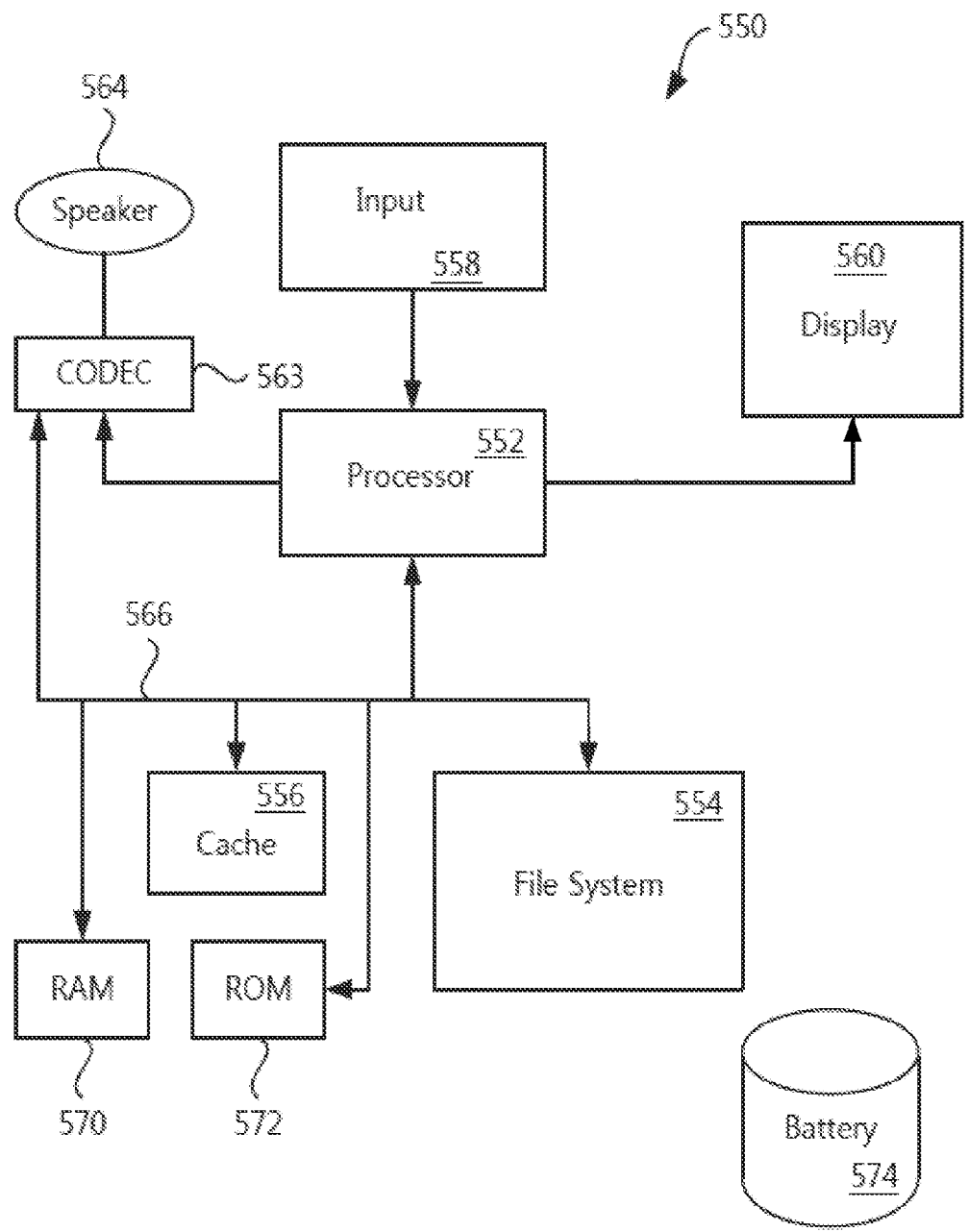
FIG. 5 is a block diagram illustrating an electronic device suitable for use with one or more of the described embodiments of the invention.

FIG. 5 is a block diagram of an electronic device 550 suitable for use with the described embodiments of the present invention. The electronic device 550 illustrates circuitry of a representative computing device. The electronic device 550 includes a processor 552 that pertains to a microprocessor or controller for controlling the overall operation of the electronic device 550. The electronic device 550 stores media data pertaining to media items in a file system 554 and a cache 556. The file system 554 is, typically, a storage disk or a plurality of disks. The file system 554 typically provides high capacity storage capability for the electronic device 550. However, since the access time to the file system 554 is relatively slow, the electronic device 550 can also include a cache 556. The cache 556 is, for example, Random-Access Memory (RAM) provided by semiconductor memory. The relative access time to the cache 556 is substantially shorter than for the file system 554. However, the cache 556 does not have the large storage capacity of the file system 554. Further, the file system 554, when active, consumes more power than does the cache 556. The power consumption is often a concern when the electronic device 550 is a portable media device that is powered by a battery 574. The electronic device 550 can also include a RAM 570 and a Read-Only Memory (ROM) 572. The ROM 572 can store programs, utilities or processes to be executed in a non-volatile manner. The RAM 570 provides volatile data storage, such as for the cache 556.

The electronic device 550 also includes a user input device 558 that allows a user of the electronic device 550 to interact with the electronic device 550. For example, the user input device 558 can take a variety of forms, such as a button, keypad, dial, touch screen, audio input interface, visual/image capture input interface, input in the form of sensor data, etc. Still further, the electronic device 550 includes a display 560 that can be controlled by the processor 552 to display information to the user. A data bus 566 can facilitate data transfer between at least the file system 554, the cache 556, the processor 552, and the CODEC 563.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a non-transitory computer readable medium. The computer readable medium is defined as any data storage device that can store data which can thereafter be read by a computer system. Examples of the computer readable medium include read-only memory, random-access memory, CD-ROMs, DVDs, magnetic tape, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not target to be exhaustive or to limit the embodiments to the precise forms disclosed. It will be apparent to one of ordinary skill in the art that many modifications and variations are possible in view of the above teachings.

Although the foregoing invention has been described in detail by way of illustration and example for purposes of clarity and understanding, it will be recognized that the above described invention may be embodied in numerous other specific variations and embodiments without departing from the spirit or essential characteristics of the invention. Certain changes and modifications may be practiced, and it is understood that the invention is not to be limited by the foregoing details, but rather is to be defined by the scope of the appended claims.

What is claimed is:

1. A method of creating a choreographed animated scene, the method comprising:
 via a user interface of a scene generator of a digital media production system, receiving specifications of asset elements to be used in the scene, said specifications including associations of a first plurality of the asset elements with respective first marker positions placed at specified locations within the scene;
 displaying within the user interface those of the plurality of asset elements having respective first marker positions within a visible portion of the scene at their respective first marker positions;
 receiving, via the user interface, animation specifications for the asset elements in the form of:
  defined second marker positions for a second plurality of the asset elements within the scene, at least some of the second marker positions being located at different positions within the scene than the first marker positions, and
  defined respective movements for those of the asset elements having associated ones of the first marker positions and second marker positions from an associated one of the first marker positions to an associated one of the second marker positions, said defined movements being specified by associated transition duration values including time duration values for displacements of respective asset elements between their associated first marker position and second marker position, and ease-in and ease-out timing durations, such that said defined movements for those of the asset elements having associated ones of the first marker positions and second marker positions are defined only by resulting spatial arrangements of the respective first marker positions and second marker positions and transition duration values of the asset elements having associated ones of the first marker positions and second marker positions, and not by intermediate states of the asset elements having associated ones of the first marker positions and second marker positions between their associated first marker positions and second marker positions; and
 generating a choreography for the asset elements of the scene by defining sequences of movements of the asset elements according to their respective defined movements and associated times of said respective defined movements wherein said respective defined movements are each calculated according to locations of respective ones of the first and second marker positions, and speeds based upon the transition duration values.

2. The method of claim 1, further comprising storing, in a data storage repository, a scene definition that identifies the asset and includes the respective first and second marker positions, the associations of the first and second marker positions with the first and second plurality of asset elements, respectively, and the choreography.

3. The method of claim 2, further comprising synchronizing the scene definition with the data storage repository via a cloud storage service.

4. The method of claim 2, further comprising:
retrieving the scene definition from the data storage repository;
retrieving one or more asset elements referenced by the scene definition from the data storage repository;
generating video data based upon the scene definition and the one or more asset elements; and
sending the video data to an output device.

5. A distributed system for producing a choreographed animated scene in accordance with defined movement instructions, the system comprising:
an asset manager storing media elements including assets and scenes;
a scene generator configured to (1) produce scene definitions by facilitating user creation and modification of the scenes via a user interface that enables a user to select and place various ones of the assets on a design canvas, and define positions and motion of those of the assets so placed in a three-dimensional space by applying movement instructions to the assets placed on the design canvas, the movement instructions comprising: time duration values, ease-in timing duration, and ease-out timing duration, and (2) store the scene definitions in the asset manager, wherein the positions are defined by respective first and second marker positions for the assets within the scene definitions, at least some of the second marker positions being located at different positions than the first marker positions, and the motions of the assets are specified by the time duration values for displacements of respective ones of the assets between their respective first marker position and second marker position and the ease-in and ease-out timing durations, such that said motions of the assets having associated first marker positions and second marker positions within a scene definition are defined only by resulting spatial arrangements of their respective first marker positions and second marker positions, the time duration values, and the ease-in and ease-out timing durations, and not by intermediate states of the asset elements between their associated first marker positions and second marker positions; and
a playback controller configured to retrieve selected scene definitions and those of the assets used by the selected scene definitions from the asset manager and to execute the selected scene definitions and generate a resulting video that includes a choreography of sequences of movements of the assets according to their respective movement instructions and associated times for executions of said respective movement instructions.

6. The distributed system of claim 5, wherein the asset manager is further configured to automatically propagate changes made by the user to the assets and scenes to other computer systems.

7. The distributed system of claim 5, wherein the user interface is configured to permit the user to specify that the movements are triggered based on events other than time.

8. The distributed system of claim 5, wherein the asset manager is further configured to synchronize changes made to the assets and scenes in videos generated by the playback controller.

9. The distributed system of claim 5, wherein either or both of the assets and the scenes are generated from templates customized according to specified parameter values supplied by the user and the templates are stored by the asset manager.

10. The distributed system of claim 9, wherein the asset manager is configured to provide one or more asset templates or scene templates responsive to a user request to create a new asset or new scene, respectively, thereby permitting the user to select one of the respective templates.

* * * * *